(12) United States Patent
Murayama

(10) Patent No.: US 6,378,543 B1
(45) Date of Patent: Apr. 30, 2002

(54) HOLLOW POPPET VALVE AND THE METHOD FOR MANUFACTURING THE SAME

(75) Inventor: Takemi Murayama, Hadano (JP)

(73) Assignee: Nittan Valve Co., Ltd., Kanagawa (JP)

( * ) Notice: Subject to any disclaimer, the term of this patent is extended or adjusted under 35 U.S.C. 154(b) by 0 days.

(21) Appl. No.: 09/582,205

(22) PCT Filed: Feb. 12, 1999

(86) PCT No.: PCT/JP99/00590

§ 371 Date: Jul. 17, 2000

§ 102(e) Date: Jul. 17, 2000

(87) PCT Pub. No.: WO00/47876

PCT Pub. Date: Aug. 17, 2000

(51) Int. Cl.⁷ .................................................. B21K 1/22
(52) U.S. Cl. ................. 137/15.18; 251/368; 123/188.3; 29/888.45
(58) Field of Search ..................... 123/188.3; 251/318, 251/368; 137/15.18; 29/888.45, 88.452

(56) References Cited

U.S. PATENT DOCUMENTS

| | | | | |
|---|---|---|---|---|
| 1,714,690 A | * | 5/1929 | Nevins ................. | 123/188.3 X |
| 2,407,561 A | * | 9/1946 | Lincoln .................... | 123/188.3 |
| 2,435,948 A | * | 2/1948 | Wischhusen ........... | 29/888.452 |
| 2,439,240 A | * | 4/1948 | Cummings ............... | 123/188.3 |
| 2,452,628 A | * | 11/1948 | Bartlett et al. ......... | 29/888.452 |
| 2,627,259 A | * | 2/1953 | Wood et al. ............. | 123/188.3 |
| 2,636,255 A | * | 4/1953 | Jeudi dit Jeudy ........ | 29/888.45 |
| 3,710,773 A | * | 1/1973 | Piech et al. ............... | 123/188.3 |
| 5,619,796 A | * | 4/1997 | Larson et al. ........ | 29/888.45 X |
| 5,823,158 A | * | 10/1998 | Heimann, Jr. et al. ... | 123/188.3 |

FOREIGN PATENT DOCUMENTS

| | | |
|---|---|---|
| JP | 61-84347 | 4/1986 |
| JP | 63-109207 | 5/1988 |
| JP | 2-124204 | 10/1990 |
| JP | 6-299816 | 10/1994 |

* cited by examiner

Primary Examiner—Henry C. Yuen
Assistant Examiner—Eric Keasel
(74) Attorney, Agent, or Firm—Nixon Peabody LLP; Thomas W. Cole

(57) ABSTRACT

In order to propose a hollow poppet valve having an excellent, high strength to weight properties by constructing it in order that no influence from welding heat is exerted onto the face, and no stress is concentrated at the welded portion, and a method for manufacturing the same valve, a fillet area 14 opened like a flare is integrally formed at one end of the cylindrical stem portion 12, and a cap is integrally welded to the open edge portion of the fillet area, wherein only the open edge portion of the fillet area 14 is made thicker than the other portions, and the face 15 is formed on the thicker portion 30. Thereby, it is possible to prevent the hardness of the face 15 from being lowered due to the cap welding heat, and stress from being concentrated at the welded portion, whereby the property of high strength to weight can be improved.

3 Claims, 11 Drawing Sheets

|  | Stem portion | Cap |
|---|---|---|
| NO.1 | SUS305 | SUS305 |
| NO.2 | SUS430 | SUS430 |
| NO.3 | Ti alloy | Ti alloy |

|  | Diameter of beveled portion | Outer diameter of stem | Length | Hollow capacity | Thickness of stem | Weight |
|---|---|---|---|---|---|---|
| S1 | 29mm | 6mm | 100mm | 2.92cm³ | 0.5mm | 20.0g |
| S2 | 25mm | 5.5mm | 145mm | 2.97cm³ | 0.5mm | 20.9g |
| S3 | 28mm | 6mm | 103mm | 3.17cm³ | 0.5mm | 20.3g |
| S4 | 33.5mm | 6mm | 100mm | 3.38cm³ | 0.5mm | 27.1g |
| S5 | 29mm | 5.5mm | 145mm | 3.22cm³ | 0.5mm | 23.7g |

| Number of times | Prior art valves | Test samples |
|---|---|---|
| 1st time | 5560.0 | 6123.6 |
| 2nd time | 5671.2 | 5784.6 |
| 3rd time | 6516.3 | 6234.1 |
| 4th time | 5649.0 | 5839.7 |
| 5th time | 6182.7 | 5986.3 |
| 6th time | 5582.2 | 5587.2 |
| 7th time | 5471.0 | 6028.9 |
| 8th time | 5849.1 | 5789.3 |
| 9th time | 5826.9 | 5964.2 |
| 10th time | 6182.7 | 6074.4 |
| Average | 5849.1 N | 5941.2 N |

| Number of times | Prior art valves | Test samples |
|---|---|---|
| 1st time | 1.634 | 3.046 |
| 2nd time | 1.556 | 2.998 |
| 3rd time | 1.521 | 2.912 |
| Average | 1.570 N | 2.985 N |

Area a 100 through 149HV

Area b 150 through 199HV

Area c 200HV or more

HOLLOW POPPET VALVE AND THE METHOD FOR MANUFACTURING THE SAME

FIELD OF THE INVENTION

The present invention relates to a hollow, reduced weight poppet valve in which a cap is integrated by welding to a flare-shaped fillet area formed at one end of a valve stem and a method for manufacturing the same.

BACKGROUND OF THE INVENTION

Japanese Laid-Open Patent Publication No. 299816 of 1994 discloses, as shown in FIG. 14 and FIG. 15, a valve having a fillet area 4 which is opened like a flare formed at the end portion of a cylindrical stem portion 2. A cap 6 is integrated into the fillet area 4 by welding, therefore forming a hollow poppet valve wherein numeral 7 indicates a welded portion.

Also, as shown in FIG. 14, a face 8 is secured at the cap 6 while a face 8 is provided at the fillet area 4 in the valve shown in FIG. 15.

However, it has been found, through an examination of the Vickers hardness hereinafter called "HV" in the vicinity of the face on such a prior art poppet valve that, although the face needs a hardness of at least 200 HV to avoid premature wear, that no such hardness was attained.

FIG. 16 and FIG. 17 show the hardness distribution on a longitudinally sectional plane of the prior art valve in the vicinity of the cap-welded portion shown in FIG. 14 and FIG. 15. Although areas c, d, e, f and g other than the welded portion "a" and an area b surrounding the area "a" have a hardness that is more than 200 HV required for the valve, the hardness of the welding area "a" was 100 through 149 HV. and of the area facing the welded portion "a" (that is, the area surrounding the welded portion "a") was 150 through 199 HV. In either structure, the hardness of the area that is roughly the half of the face 8 was less than 200 HV which is insufficient for the face. In addition, in FIG. 16, the areas c through g having 200 HV or more are such that, from a position nearer to the welded portion "a", the area c has a hardness of 200 through 249 HV, area d has 250 through 299 HV, area e has 300 through 349 HV, area f has 350 through 399 HV, and area g has 400 HV or more.

The present inventor has examined causes as to why the hardness of the face 8 was lowered to below 200 HV and has found that, since the cap 6 is welded in the vicinity of the face 8, and the face 8 is influenced by the welding temperature, it was difficult for the face 8 to keep the necessary hardness. Further, in the structure shown in FIG. 14, the inventor has observed that a load (stress) caused by valve seating is concentrated in the vicinity of the welded portion 7 such that the welded portion 7 may be easily fractured. And, in the structure shown in FIG. 15, there is a fear that stress is concentrated onto the bent portion 5 in the vicinity of the welded portion 7, whereby the welded portion 7 may be broken.

The present invention was developed to solve the above-mentioned problems. It is therefore an object of the invention to provide a hollow poppet valve whose property of high strength to weight is excellent by designing it such that no metal softening influence due to welding is provided onto the face and no stress is concentrated at the welding portion.

DISCLOSURE OF THE INVENTION

In order to achieve the object, a hollow poppet valve having a fillet area opened like a flare, which is formed at one end of a cylindrical stem portion, and a cap integrated by welding at the opened edge portion of the fillet area, is provided such that the opened edge portion of the fillet area is formed to be thicker than the other areas, and a face is formed at the thicker portion.

The open edge portion at which a cap is welded is thicker than the other areas to reduce the influence of the heat of welding on the face.

By making the open edge portion of the fillet area thicker, adverse metallurgical influences due to welding heat on the face can be evaded, whereby the face can be maintained at a desired hardness. By making the other areas of the valve which are not significantly influenced by the heat of welding thinner, the total weight of the valve can be reduced.

Also, since the face which is brought into contact with the seat face at the cylinder side is formed at the fillet area (the outer circumferential side), the concentration of load (stress) at the welded portion secured inside of the thicker portion is avoided.

Also, a hollow poppet valve is featured in that, the welded portion of the cap is spaced by at least 0.5 mm or more, and more preferably 0.8 mm or more from the face.

Such spacing makes it possible to evade the unwanted metallurgical influence of welding heat onto the face.

Also, a hollow poppet valve is featured in that, the cap is welded by an electron beam or laser beam.

In the electron beam welding or laser beam welding, since the beam diameter is small, the width of the welded portion is narrowed, and the welding can be instantaneously carried out at a high temperature. Accordingly, unwanted thermal influences on the face can be further reduced.

Further, a hollow poppet valve is featured in that, in the thicker portion is bent at the open edge portion of the fillet area so that the longitudinal section thereof becomes a laterally turned V, and is formed so as to extend therefrom, wherein the inside of the bent portion includes an annular stage portion for receiving the edge of the cap so that the cap is solely supported by the stage portion and weld joint.

Since stress is concentrated at the bent portion, no stress is accordingly concentrated at the welded portion spaced away from the bent portion. Also, due to the shape of the inside of the bent portion, the stress concentrated at the bent portion can be dispersed to the entire bent portion.

Further, a hollow poppet valve is featured in that, the inner circumferential face of the thicker portion at the fillet area is constructed of a cylindrical face centering around the axial center of the stem portion, and the face is constructed of a tapered plane inclined in a range from 25 through 45 degrees with respect to the axial center of the stem portion.

With such a construction, it is easy to form the thicker portion and to space the welded portion away from the face.

A hollow poppet valve is featured in that, the aforementioned stage portion for engagement of the cap positions the cap with respect to the fillet area. That is, the stage portion can function as a positioning member when welding the cap to the fillet area.

Also, the cap engagement stage portion functions so as to space the welding portion away from the stress concentrated part in the fillet area.

Still further, the cap engagement stage portion carries the cap from its downside, and can function so as to relieve the load acting on the welded portion resulting from pressure operating on the fire-contacted side of the cap.

Also, a method for manufacturing a hollow poppet valve comprises the steps of press-forming a cup-shaped material in a cold state; drawing and forming so as to draw, in a cold state, a cylindrical stem portion having a fillet area opened like a flare at one end thereof, and welding a cap on the open edge portion of the fillet area, wherein the press-forming step forms a flange-like thicker portion at the open edge portion of the cup-shaped molded member, and the drawing and forming step forms a thicker portion, on which a tapered plane is formed, at the open edge portion of the fillet area of the molded member.

It is preferable that an electronic beam and a laser beam is used to weld the cap, and that the drawing step provides a cap engagement stage portion formed at a position spaced by at least 0.5 mm or, more preferably 0.8 mm or more from the face inside the open edge portion of the fillet area.

BEST MODE FOR CARRYING OUT THE INVENTION

Next, a description is given of embodiments of the invention on the basis of examples with reference to the accompanying drawings FIG. 1 through FIG. 12.

Figure 1:
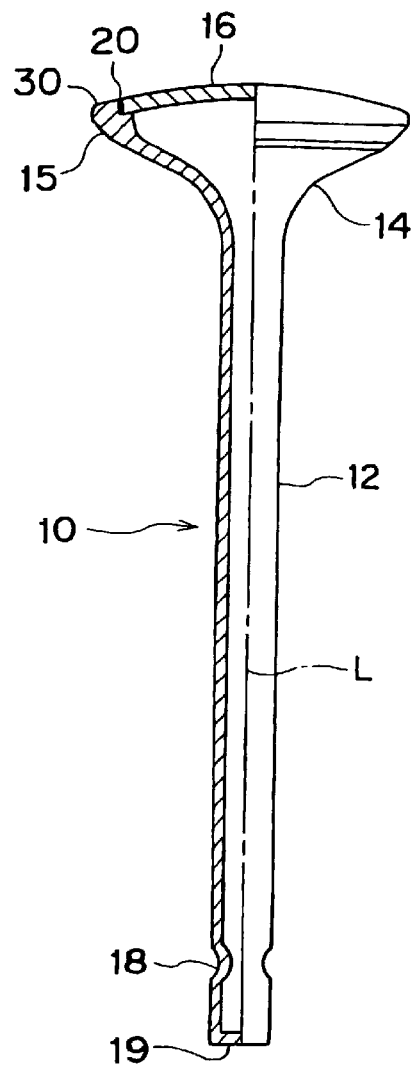
FIG. 1 is a partially exploded front elevational view of a hollow poppet valve according to one embodiment of the invention.
Figure 2:
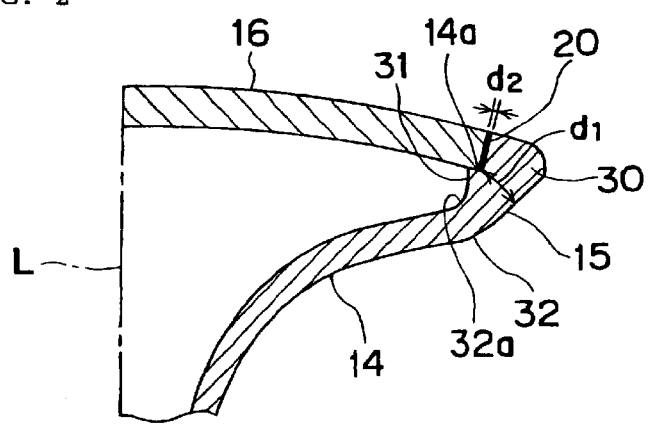
FIG. 2 is an enlarged sectional view of the surrounding of a cap-welded portion.

In FIG. 1 which is a partially exploded front elevational view of a hollow poppet valve according to one embodiment of the invention, and in FIG. 2 which is an enlarged sectional view of a cap welded portion, numeral 10 is a hollow poppet valve. A fillet area 14 opened like a flare is integrally formed on the upper end portion of a cylindrical stem portion 12 having its lower end closed, and a face 15 is formed on the outer circumference of the fillet area 14, and a disk-like cap 16 is integrally welded to the open edge portion of the fillet area 14. Numeral 18 is a cotter groove provided on the outer circumference of the lower end portion of the stem portion 12. Numeral 19 is a tip portion provided at the lower end portion of the stem portion 12.

Numeral 20 indicates a welding portion between the open edge portion at the fillet area 14 and the cap 16. The cap 16 is curved upward with its middle portion placed on the top position, and is provided with sufficient strength to stand against pressure acting upon the fire-retarding side of the valve (cap 16) even though it is comparatively thin. Also, the cap 16 is composed so as to be 7 mm thick at the thinnest middle portion and 12 mm thick at the thickest circumferential portion.

A cap engagement stage 14a (See FIG. 14) that has a depth equivalent to the thickness of the cap 16 is circumferentially provided inside the open edge portion of the fillet area 14, wherein the cap 16 is supported at the stage 14a and welded thereat. The stage 14a functions as a positioner when welding the cap 16 to the fillet area 14, and at the same time, supports the cap 16 from the underside, wherein the stage 14a also functions so as to relieve the load (stress) acting on the welded portion 20 resulting from pressure acting on the fire-contacted face of the valve (cap 16).

The stem portion 12 is formed so as to be of almost uniform thickness (0.5 mm), excluding the fillet area 14, and it is formed so as to become thinner and thinner toward the open edge portion side (upward in FIG. 1) of the fillet area 14. And, the face 15 is formed on the outer circumference of the thicker portion 30, whereby it is composed that no influence due to the cap welding heat is exerted onto the face 15.

Also, the thicker portion 30 provided at the open edge portion of the fillet area 14 is bent so that the longitudinal section thereof becomes a laterally-turned V. and is formed so as to extend therefrom, wherein the inside 32a of the bent portion 32 has a stepped profile.

Therefore, the stress exerted on the fillet area 14 is concentrated at the bent portion 32 by a downward pulling of the stem portion 12. Accordingly, the stress is not influenced on the welded portion 20 spaced from the bent portion 32. Also, Since the inside 32a of the bent portion is stepped, the stress concentrated at the bent portion 32 is totally dispersed, whereby a structure having excellent durability can be secured.

In addition, the inner circumferential surface 31 of the thicker portion 30 is composed of a cylindrical surface centering around the axial center L of the stem portion 12, and the face 15 formed on the outer circumference of the thicker portion 30 is composed of a tapered plane inclined by 45 degrees with respect to the axial center L of the stem portion 12. Further, since the cap 16 is welded to the stage 14a provided inside the thicker portion 30, the welded portion 20 is spaced by approx. 0.8 mm ($d_f$=0.8 mm) from and positioned at the face 15, wherein there is no case where the hardness of the face is lowered due to exertion of the welding temperature of the cap 16 onto the face 15, and an appointed hardness of the face can be secured and maintained.

In addition, the cap 16 is welded by electron beam welding or laser beam welding. Since the beam diameter is small in the electron beam welding or laser beam welding, the width $d_2$ of the welding portion 20 may be small, and the welding is instantaneously carried out at a high energy. Accordingly, the thermal influence of welding on the face 15 may be minimized.

Also, in view of minimizing the influence (softening of the metal) due to the welding heat, electron beam welding is superior to laser beam welding. However, since in the electron beam welding it is necessary to make the welding atmosphere vacuous, laser beam welding is superior in view of the production efficiency because laser beam welding does not have any such limitation. Therefore, it is preferable that electron beam welding is employed in the case when manufacturing for reliability or with respect to valves on which a great load (stress) may be applied, and laser beam welding is employed when high productivity is desired.

Figures 3, 4, 5:
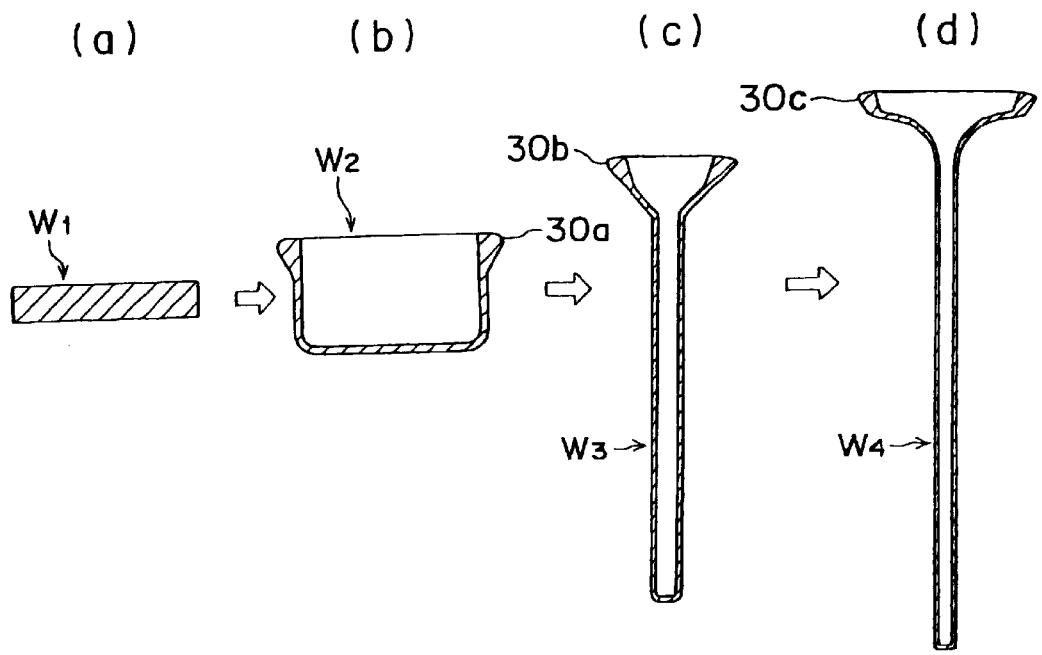
FIG. 3 is a view showing a manufacturing process of the same hollow poppet valve.
FIG. 4 is a view showing the materials of test samples.
FIG. 5 is a view showing the dimensions and weight of the test samples.

Next, a description is given of a manufacturing process of a hollow poppet valve 10 illustrated in FIG. 3.

First, as shown in FIGS. 3(a) and (b), a blank material $W_1$ is formed into shape like a disc by a cold pressing process. Further, the cold pressing and forming process includes a drawing step by which the blank material $W_1$ is formed to be cup-shaped, and a press-forming process by which a thicker flange-like portion 30a is pressed and formed at the open edge portion side of the cup-shaped formed component $W_2$. Also, in order to facilitate formation which will be carried out later by a transfer press, annealing is performed as necessary.

As shown in FIGS. 3(c) and (d), the stem portion is drawn and formed at the cup-shaped formed component $W_2$ by a cold drawing and forming process using a transfer press, and simultaneously, the thicker portions 30b and 30c, and a stage portion 14a are pressed and formed at the cup-shaped open edge portion side, thereby forming components $W_3$ and $W_4$ of an appointed size, at one end of which a fillet area opened like a flare is formed. In the cold drawing and forming process shown in FIGS. 3(c) and (d), a mandrel maybe used as necessary. Also, as a rule, although no annealing is performed, there may be a case where annealing is intermediately carried out where the material is hard or it is difficult to form.

Next, a cotter groove 18 is formed at the lower end portion of the stem portion 12 by a roll forming process. And, finally, a cap 16 which is prepared separately form the stem portion 12 is welded to the stage portion 14a of the fillet area 14 by electron beam welding or laser beam welding.

As shown in FIG. 4, in any test sample, the weight of the resulting valve is almost half the weight of solid poppet valves using the same materials, wherein it was confirmed that lightening of the weight is satisfactory. In addition, the test samples $S_1$ through $S_3$ among the samples $S_1$ through $S_5$ in FIG. 5 used the materials shown in No. 1 among No. 1 through No. 3 in FIG. 4, and the test samples $S_4$ and $S_5$ used the materials shown in No. 2.

Figure 6:
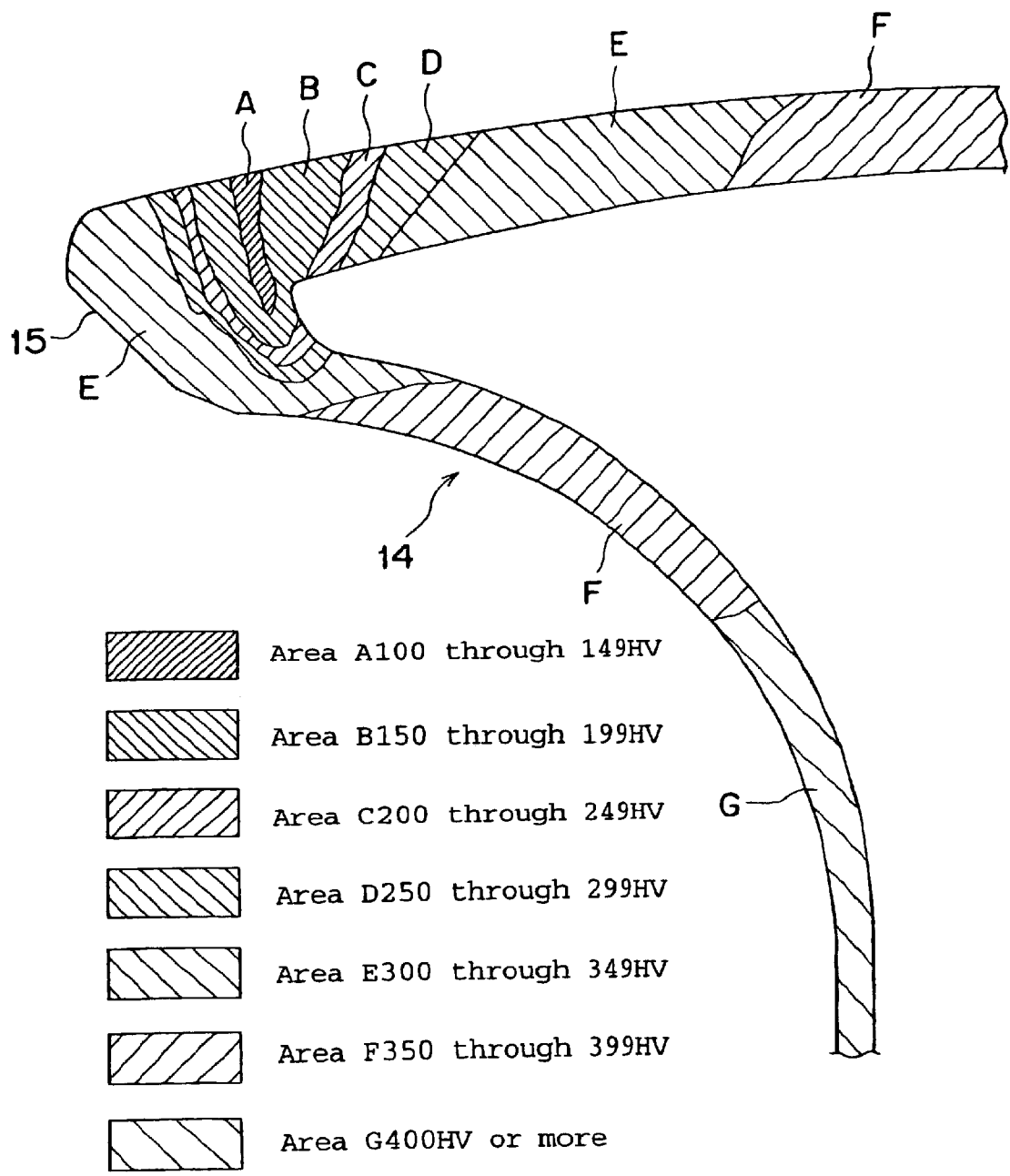
FIG. 6 is a view of hardness distribution of the vicinity of the face of the test samples.

FIG. 6 shows the hardness distribution in the vicinity of the face of the test samples. As shown in this drawing, the hardness at the welded portion 20 shown with letter A is softened to 100 through 149 HV, the hardness of portion 13 surrounding the welded portion A is 150 through 199 HV, that is, the hardness at the portion B is more or less softened. However the hardness of portion C or D outside them is 200 through 249 HV or 250 through 299 HV, and the hardness of still further outer portion E (the portion at which the face 15 is formed) is 300 through 349 HV. The hardness of the portion F or G even farther from the welded portion A is 350 through 399 HV or more than 400 1 W. That is, in the embodiment since the cap welded portion is spaced by 0.8 mm form the face 15, the influence due to the cap welding heat is reduced on the face 15, wherein hardness of 300 through 349 1 W can be secured.

Therefore, in the test samples, the hardness of the entire face 15 can be kept at 300 through 349 1 W or more. This is remarkably different from the prior art valves whose hardness is 200 1 W or less at a roughly half area of the face (See FIG. 14 through FIG. 17).

Figures 7, 8:
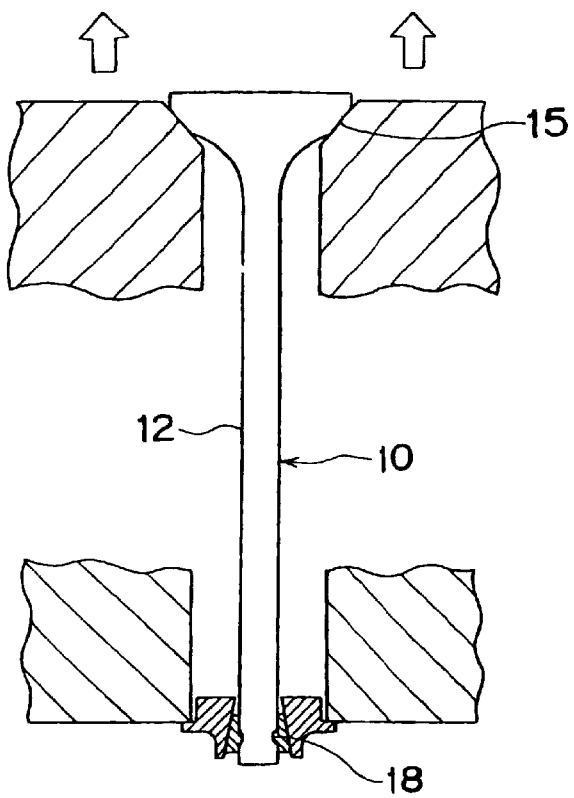
FIG. 7 is a view showing a tension test.
FIG. 8 is a view showing the results of the tension test.

Further, a tensile strength test was carried out on the test samples, using a tension tester as shown in FIG. 7. The results shown in FIG. 8 were obtained. In the test samples, a fracture occurred from the cotter groove 18, wherein no remarkable difference between the prior art valves shown in FIG. 14 and the test samples could be recognized.

Figures 9, 10:
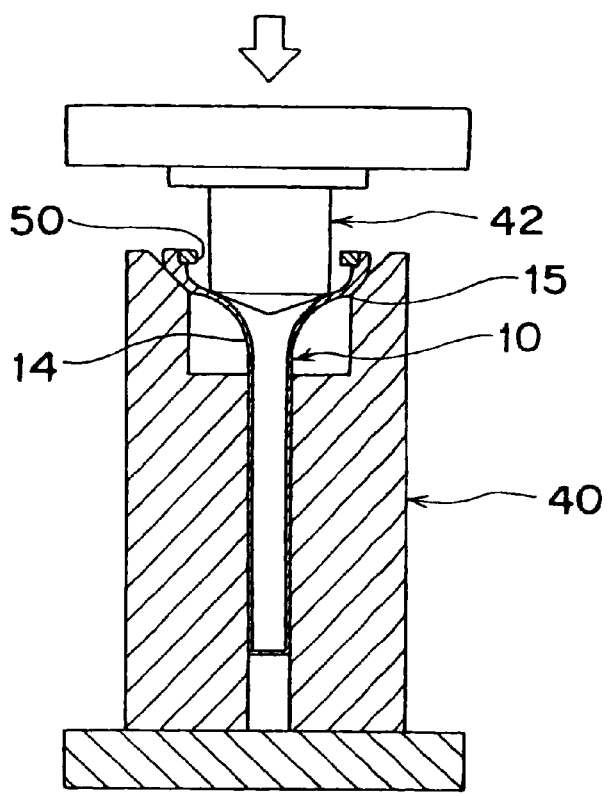
FIG. 9 is a view showing a state of a stress concentration test.
FIG. 10 is a view showing the results of the stress concentration test.
Figure 11:
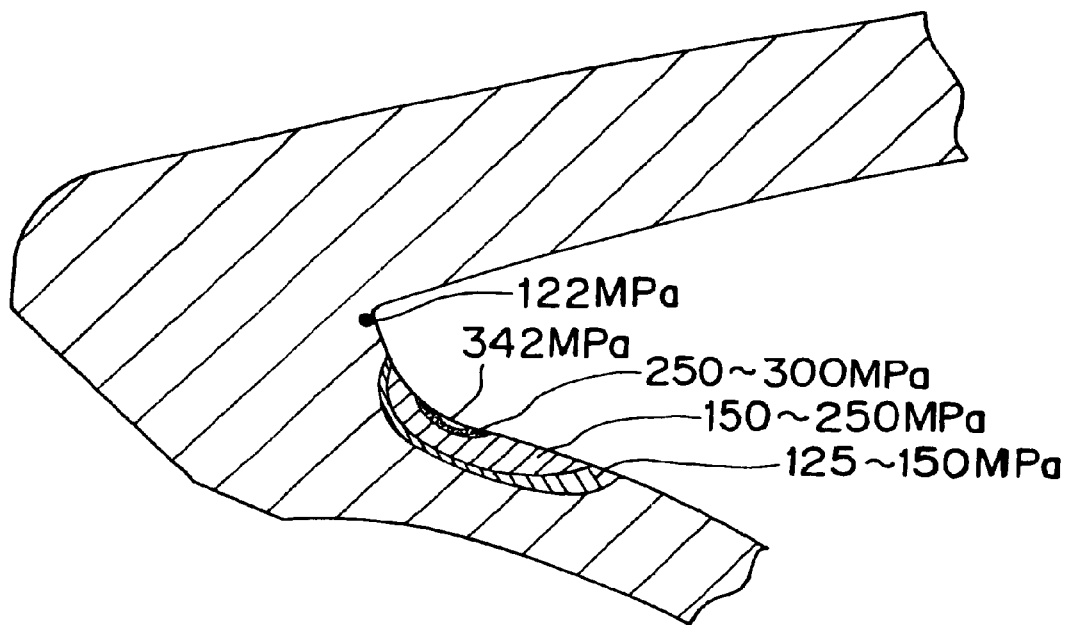
FIG. 11 is a view showing stress distribution on the longitudinally sectional plane of the test sample.
Figure 14:
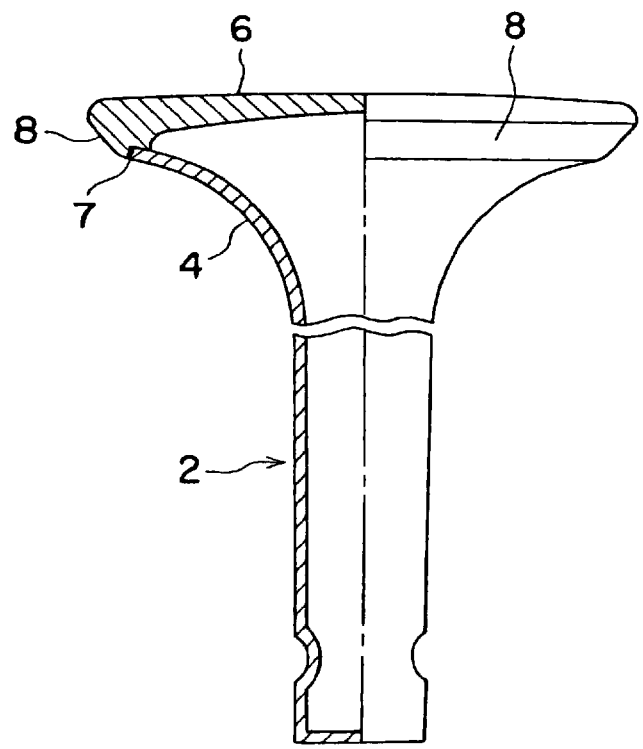
FIG. 14 is a partially exploded front elevational view showing a prior art hollow poppet valve.
Figure 15:
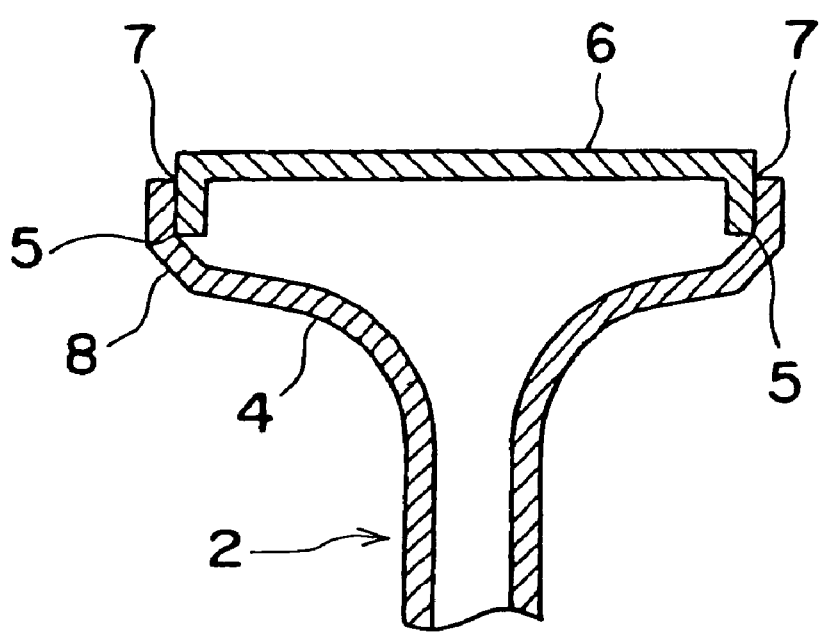
FIG. 15 is a sectional view of the major parts of another prior art hollow poppet valve.
Figure 16:
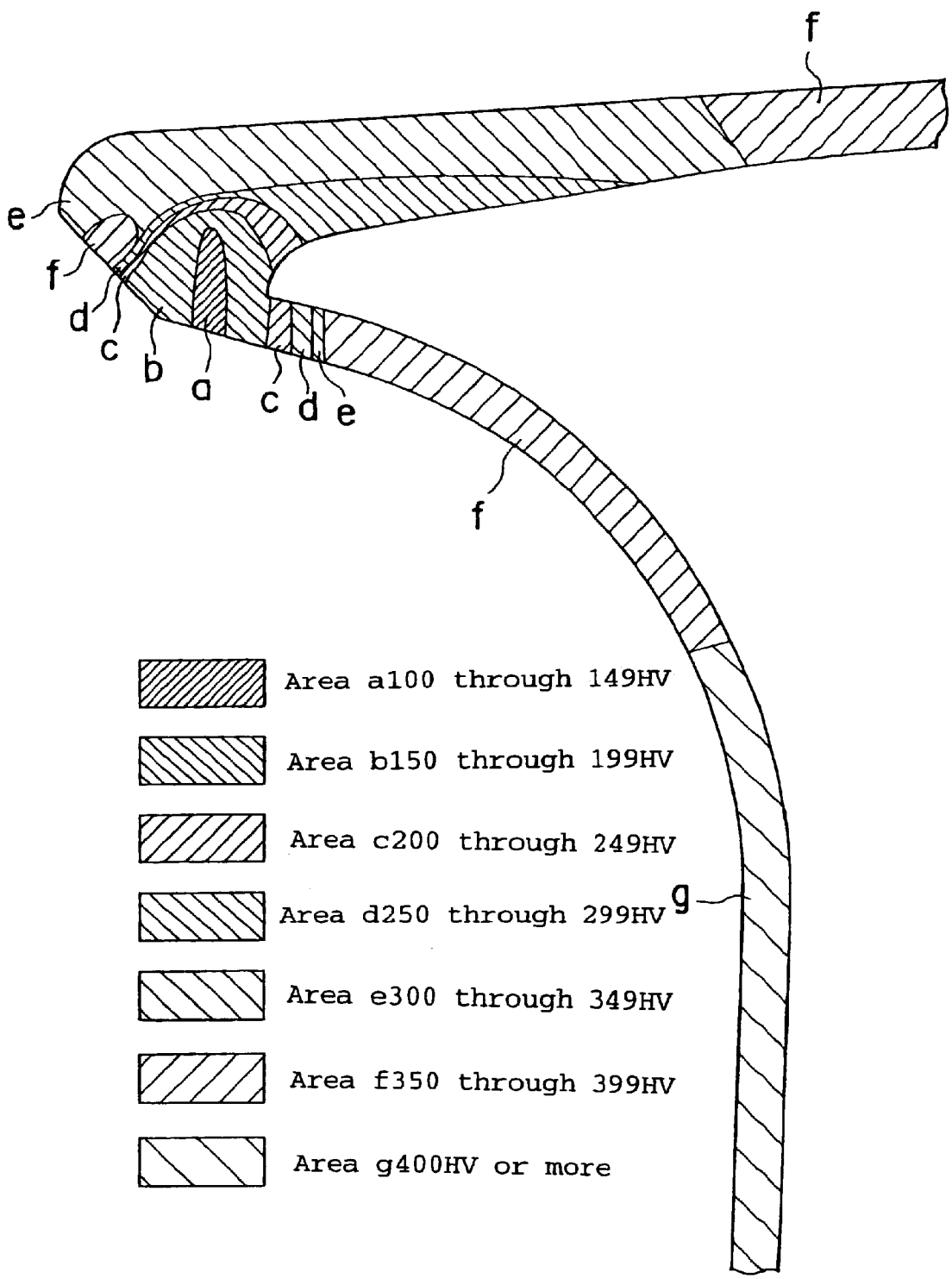
FIG. 16 is a view showing the hardness distribution in the vicinity of the face of the prior art hollow poppet valve shown in FIG. 14.
Figure 17:
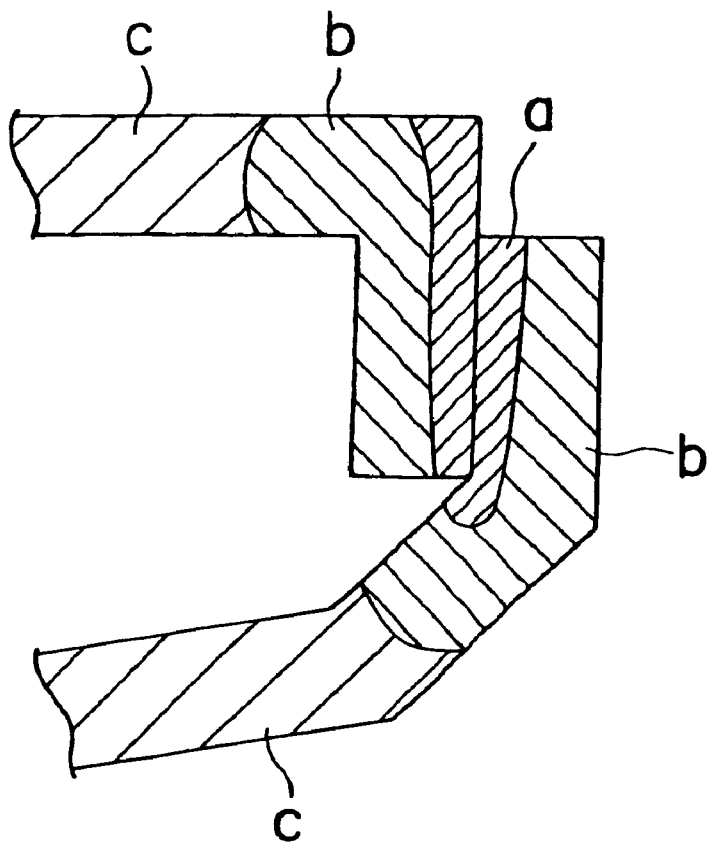
FIG. 17 is a view showing the hardness distribution in the vicinity of the face of the prior art hollow poppet valve shown in FIG. 15.
Figure 17:
Figure 17:
Figure 17:

Accordingly using a tester shown in FIG. 9, the property of stress concentration resisting strength was evaluated on both the test samples and the prior art valves (See FIG. 14). The results shown in FIG. 10 were obtained. Also, the test was constructed so that, as a stress concentration test as shown in FIG. 9, a force in the axial direction is exerted onto the inside of the fillet area 14 by a punch 42 in a state where the face 15 is supported by a die 40 from its downside. In addition, the cap of valves (test samples and prior art valves) is provided with a circular hole 50 in order to exert a force in the axial direction force.

As a result, the welded portion 7 was fractured in the prior art valve shown in FIG. 14 while the bent portion 32, at which maximum stress is concentrated, was fractured in either case. The load until the fracture occurred was great (approx. two times that of the prior art valves). Therefore, it was confirmed that the embodiment (from test samples) is superior in stress concentration resistance strength compared to the prior art valves.

And, the stress distribution when valves being seated was analyzed by the definite element method. The results shown in FIG. 11 were obtained. However, it was assumed that, simulating a seated state of the bounce area, a force of 2500N was applied in the axial direction. As has been made clear in FIG. 11, the maximum main stress of 342 Mpa (mega Pascal) is produced inside the thicker portion. Where a similar calculation was carried out with respect to the prior art valves, the maximum main stress of 6G5 Mpa is produced. This means that the maximum main stress which is produced at the fillet area (valve head) could be reduced to almost half by optimizing the shape of the embodiment (test samples).

Also, a description is given of a stress produced in the vicinity of the welded portion. In the prior art valves, although the maximum main stress (665 Mpa) is produced in the vicinity of the welded portion (in the vicinity of the place shown by numeral 7 in FIG. 14), the main stress of 122 Mpa is produced in the vicinity of the welded portion, as has been made clear in FIG. 11, in the present embodiment (test samples). Therefore, it can be said that the test samples are safer than the prior art valves in view of a lowering of the stress in the vicinity of the welded portion.

Figure 12:
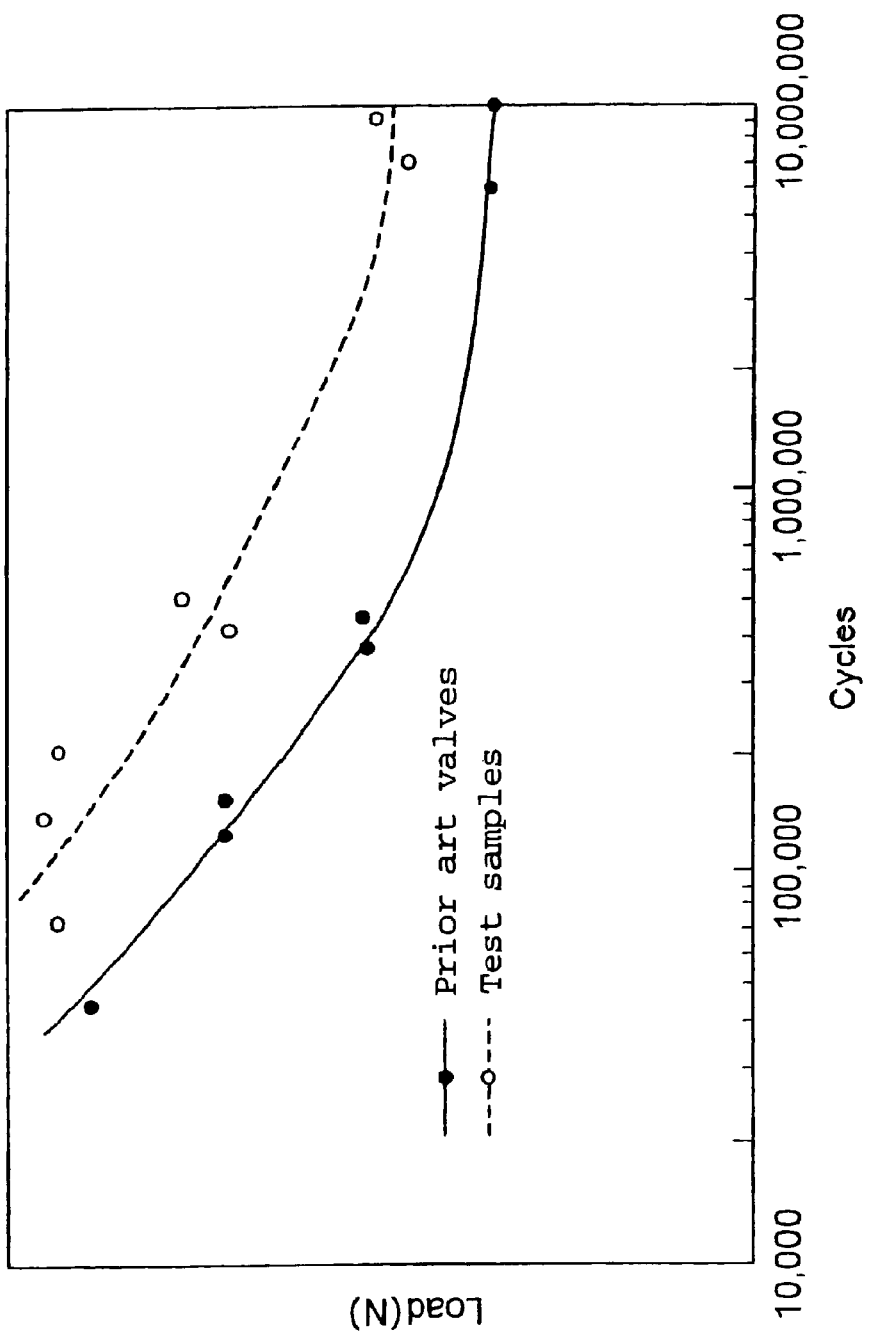
FIG. 12 is a view showing the results of a fatigue test.

Still further, as regards the test samples, a fatigue test was carried out, in which a load is repeatedly provided in the axial direction, using a tester shown in FIG. 7, and the results shown in FIG. 12 were obtained.

Although the prior art valves are inferior in durability since the face is worn, the hardness of the face in the test samples shows 300 through 249 1 W (See FIG. 6), and furthermore the stress concentration is dispersed at the bent portion 32 to some degree, wherein no influence due to stress concentration is exerted onto the welded portion 20 space from the bent portion 32. (See FIG. 11). Therefore, on the basis of FIG. 12, it was confirmed that the test samples were superior in durability to the prior art valves. In particular, the fatigue life strength was remarkably high at low load areas.

And, the test samples were evaluated with the samples mounted in a gasoline engine for automobiles, wherein it was confirmed that the test samples could endure a revolution speed which is greater by two times than in the prior art valves, and the durability was excellent.

Figure 13:
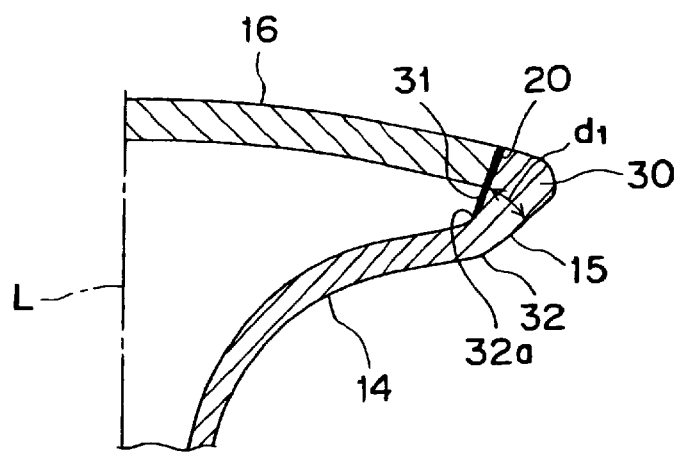
FIG. 13 is an enlarged sectional view of the major parts of a hollow poppet valve according to another embodiment.

Also, although the above embodiment was constructed so that a stage portion 14a for cap engagement was provided inside the thicker portion 30 secured at the open edge portion of the fillet area, and the cap 16 was welded to the stage portion 14a, as shown in FIG. 13, it may be constructed so that the entire inner circumferential surface 31 of the thicker portion 30 is composed of a tapered plane inclined with respect to the axial center L of the stem portion 12, and the cap 16 is welded to the thicker portion 30 without providing the stage portion 14a.

In addition, in the above embodiment, although the face 15 is constructed of a tapered plane inclined by approx. 45 degrees with respect to the axial center L of the stem portion 12, the inclination is not limited to 45 degrees, wherein it may be set in a range from 25 through 45 degrees.

Also, in the above embodiment, although the thickness of the middle portion of the cap 16 has been described as 7 mm, and the thickness of the peripheral portion of the cap and depth of the stage portion 14a carrying and supporting the cap 16 as 12 mm, these values are not limited to the above-mentioned figures. Also, in the above-mentioned embodiment, although the tip portion at the lower part of the stem portion is integrally formed at the stem body, such a structure may be acceptable, in which the portion downward of an appointed portion above or below the cotter groove is established as a tip portion, and is formed separately from the stem portion body, wherein a tip portion is integrally connected to the lower end of the stem portion body.

As has been made clear on the basis of the above-mentioned description, since, in a hollow poppet valve according to the invention, influences due to welding heat when welding the cap is not exerted on the face, it is possible to maintain the face at an appointed hardness, and at the same time, to evade stress concentration on the welded portion. Therefore, the hollow poppet valve is suitable in cases where the weight of the valves is reduced, and the strength thereof is improved (that is, the property of high strength to weight is improved).

Since unwanted influences due to welding heat on the face can be avoided, the strength can be further increased, and the weight can be further reduced.

Since the welded portion does not stand out, the appearance of the valves can be further improved. Also, since the influences due to welding heat on the face are only slight, still further improvement can be achieved strength, and a still further weight reduction can be achieved.

Since no stress is concentrated at the welded portion having low hardness, no fractures occurs at the welded portion, and accordingly Production can be facilitated, and the valve is suitable for mass production.

Welding of the cap can be smoothly and securely performed, and it is possible to propose a hollow valve in which strength is excellent.

A method for manufacturing a hollow poppet valve is provided where a hollow poppet valve being excellent in high strength to weight properties is manufactured.

What is claimed is:

1. A method of manufacturing a hollow poppet valve, comprising the steps of press-forming a metal shaped like a cup in a cold state; drawing said cup-shaped metal in a cold state to form, from a same metal, a cylindrical stem portion having a fillet area opened like a flare at one end there of wherein said fillet area has a fire contacting, valve face and an open edge portion opposite of said fire contacting valve face, said open edge portion having a wall thickness greater than a wall thickness of said stem portion and said fillet area; and welding a cap having a wall thickness less than said open edge portion onto the open edge portion of the fillet area such that said cap is supported solely by said fillet area and said weld joint and said metal forming said valve face has and HV of no less than 300.

2. A method for manufacturing a hollow poppet valve as set forth in claim 1, wherein in said welding process, said cap is welded by an electron beam or a laser beam.

3. A method for manufacturing a hollow poppet valve as set forth in claim 1, wherein in said drawing and forming steps, a stage portion for a cap engagement and support is formed at a position spaced by at least 0.5 mm from a face inside the open edge portion of the fillet area.

* * * * *